United States Patent
Nakama

(10) Patent No.: US 8,275,169 B2
(45) Date of Patent: *Sep. 25, 2012

(54) COMMUNICATION SYSTEM AND CONTROL METHOD THEREOF

(75) Inventor: Satoshi Nakama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/111,772

(22) Filed: May 19, 2011

(65) Prior Publication Data

US 2011/0219101 A1    Sep. 8, 2011

Related U.S. Application Data

(63) Continuation of application No. 11/258,511, filed on Oct. 25, 2005, now Pat. No. 7,970,163.

(30) Foreign Application Priority Data

Oct. 26, 2004  (JP) ................... 2004-311413

(51) Int. Cl.
*G06K 9/00*  (2006.01)

(52) U.S. Cl. ........................................ 382/100
(58) Field of Classification Search ............ 382/100, 382/232, 233, 236, 239, 240; 375/219; 386/283, 386/356; 725/93, 96, 146
See application file for complete search history.

(56) References Cited

U.S. PATENT DOCUMENTS 6,115,531 A * 9/2000 Yanagihara ............ 386/273
6,907,616 B2 * 6/2005 Yamauchi et al. ........ 725/96

* cited by examiner

*Primary Examiner* — Daniel Mariam
(74) *Attorney, Agent, or Firm* — Canon USA Inc. IP Division

(57) ABSTRACT

A method for controlling a communication system comprising obtaining moving picture data, inquiring about processing capability with respect to the obtained moving picture data, changing a preset transfer rate of the moving picture data to a changed transfer rate based on the inquiry results, and transmitting the moving picture data using the preset transfer rate or the changed transfer rate.

20 Claims, 4 Drawing Sheets

| COPY PROTECTION CAPABILITY ON RECEPTION SIDE | SETTING TRANSFER RATE ON TRANSMISSION SIDE | |
| --- | --- | --- |
| | HD (N TIMES) | SD |
| REFERENCE RATE | 1/N TIMES SPEED | EQUIVALENT SPEED |
| N TIMES REFERENCE RATE | EQUIVALENT SPEED | N TIMES SPEED |

COMMUNICATION SYSTEM AND CONTROL METHOD THEREOF

CROSS REFERENCE TO RELATED APPLICATIONS

This application is a continuation application of U.S. patent application Ser. No. 11/258,511 filed Oct. 25, 2005, which claims priority from Japanese Patent Application No. 2004-311413 filed Oct. 26, 2004, which are hereby incorporated by reference herein.

BACKGROUND OF THE INVENTION

1. Field of the Invention

The present invention relates to a communication system transmitting and receiving moving picture data or the like on the basis of the MPEG-2 standard or the like, and a control method thereof.

2. Description of the Related Art

It is well known that there are data processing systems reproducing a moving picture data recorded in a recording medium and carrying out dubbing by using an isochronous transfer on the basis of the IEEE Std 1394-1995 or the like. Next, one example of these data processing systems is described.

FIG. 4 is a block diagram of a data processing system 400. In this example, a system using a disk as a recording medium is described.

The data processing system 400 comprises a data processor 410 on a transmission side, a data processor 420 on a reception side, and a communication cable 430 connecting these processors. Further, the data processor 410 on the transmission side is connected with a disk 401 and a display device 402 on the transmission side, and the data processor 420 on the receptions side is connected with a disk 404 and a display device 403 on the reception side.

The moving picture data in the disk 401 on the transmission side is read by a recording and reproducing unit 411 of the data processor 410 on the transmission side, and transmitted to a display control unit 412. In the display control unit 412, decode processing is performed to display the moving picture on the display processor 402. Further, the moving picture data read by the recording and reproducing unit 411 is inputted into a digital interface unit 413 in accordance with the IEEE Std 1394-1995 or the like. Then, the moving picture data is subjected to a predetermined packetization in the digital interface unit 413, and inputted to a digital interface unit 421 of the data processor 420 on the reception side through the communication cable 430. The digital interface unit 421 is based also on the IEEE Std 1394-1995 or the like. In the data processor 420, the moving picture data transmitted from the data processor 410 is decoded by the display control unit 422, displayed on the display device 403, and recorded in the disk 404 by a recording and reproducing unit 423.

When carrying out dubbing, an encryption processing can be performed on the moving picture data to prevent an unauthorized copying using a copy protection. In this case, in the recording and reproducing unit 411 of the data processor 410 on the transmitting side, the moving picture data read from the disk 401 is encrypted in a various mode according to a limitation level of the copy. Further, in a case of the moving picture data having no copy limitation, the encryption processing is not performed.

In the data processor 410 on the transmission side, the moving picture data having copy limitation is encrypted and outputted, and the key for deciphering the encryption is transmitted only to the device authenticated by the processor 410, in order to prevent altering, tapping or the like. The encrypted moving picture data is inputted into the digital interface unit 413, and into the digital interface unit 421 of the data processor 420 on the reception side through the communication cable 430. In the data processor 420, the inputted moving picture data is subjected to calculation using the above-described key, and the encrypted moving picture data is decrypted. Then, the data processor 420 on the reception side can decode the decrypted moving picture data in the display control unit 422 so as to enable display on the display device 403 or record it in the disk 404 by the recording and reproducing unit 423.

FIG. 5 is a schematic view when the moving picture data in accordance with the MPEG-2 Transport Stream (hereinafter, referred to as the MPEG2-TS) is packetized to an isochronous packet in accordance with the IEEE1394-1995 standard.

A data column 501 of the moving picture data recorded in the disk 401 is read by the recording and reproducing unit 411, and inputted into the digital interface unit 413 by each MPEG2-TS packet 502 of 188 bytes. Time stamp data is added to each MPEG2-TS packet 502 as a header which becomes a source packet 503. Then, the source packet 503 is divided into 8 data blocks 504. Further, several data blocks 505 (in this example, 4 data blocks) are made into one isochronous data 506 according to a bit rate of the MPEG2-TS data. To each isochronous data 506 is added a common isochronous packet (CIP) header 507, an isochronous packet header 508 and a CRC data 509, and the isochronous data becomes an isochronous packet 510. In the present example, a packet consisting of 4 data blocks 505 is transmitted in each isochronous cycle, and the bit rate of the MPEG2-TS is about 6.016 Mbps.

The isochronous communication is described in the IEEE1394-1995 standard. The encrypting technique is described in the "5C Digital Transmission Content Protection White Paper Revision 1.0" and the "Digital Transmission Content Protection Specification Volume 1_Revision 1.2a (Informational Version)". Further, a method for transmitting the MPEG2-TS data as the isochronous packet on the basis of the IEEE1394 standard is described in the "IEC 61883-4: Consumer audio/video equipment-Digital interface-Part 4: MPEG2-TS data transmission".

However, in the above data processing system, when the moving picture data is dubbed by transmitting the data using the above-described isochronous transfer from the data processor 410 to the data processor 420, time required for dubbing is the same as its reproducing time. For example, in the case of the moving picture data of one hour, one hour is also required for its dubbing. Further, if the processing capability of the data processor 420 on the reception side is inferior to the data processor 410 on the transmission side with respect to a transfer rate of the moving picture data, the transmitted moving picture data cannot be dubbed.

That is, in the data processing system 400, when the data is transferred from the data processor 410 to the data processor 420, the most suitable data transferring for both sidescan not be performed because consideration is not given to the data processor 420.

SUMMARY OF THE INVENTION

The present invention is to overcome the above-described drawbacks. The present invention is, for instance, to optimize a data transfer between the transmission side and the reception side in consideration of a processing capability of the reception side.

According to an aspect of the present invention, a transmission device for use in a communication system including at least one reception device, the transmission device including a reading unit configured to obtain moving picture data, a control unit configured to inquire with the at least one reception device about processing capability with respect to the moving picture data obtained by the reading unit and to change a preset transfer rate of the moving picture data obtained by the reading unit to a changed transfer rate based on the results of the inquiry, and a transmission unit configured to transmit the moving picture data obtained by the reading unit to the reception device using the preset transfer rate or the changed transfer rate.

According to another aspect of the present invention, a method for controlling a communication system includes the steps of obtaining moving picture data, inquiring about the processing capability with respect to the obtained moving picture data, changing the preset transfer rate of the moving picture data according to a changed transfer rate based on the results of the inquiring step, and transmitting the moving picture data using the preset transfer rate or the changed transfer rate.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate an embodiment of the invention and, together with the description, serve to explain the principles of the present invention.

DESCRIPTION OF THE EMBODIMENTS

Embodiments of the invention will be described in detail below with reference to the drawings.

Figure 1:
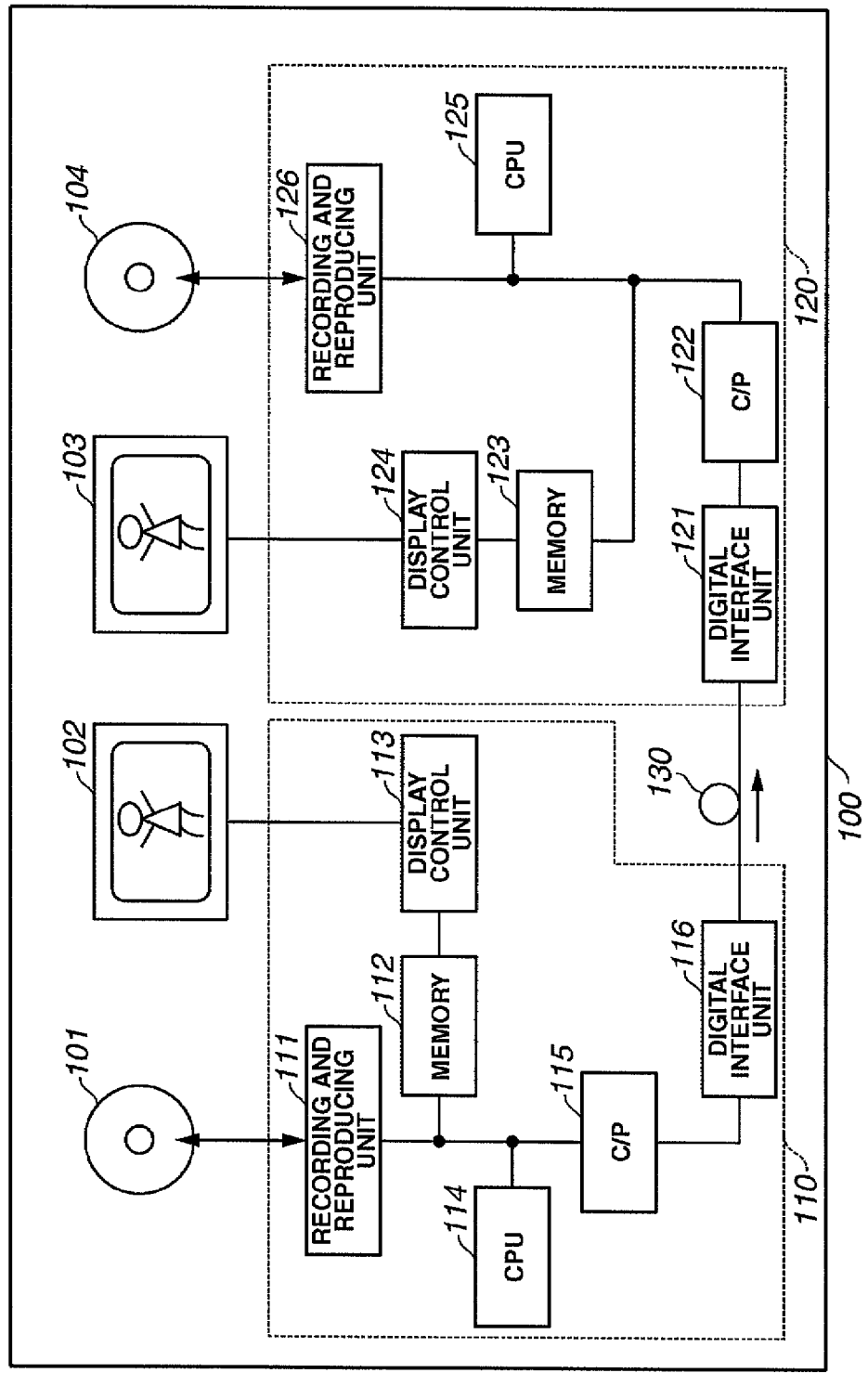
FIG. 1 is a block diagram of a data processing system according to an embodiment of the present invention.

FIG. 1 is a block diagram of a data processing system according to an embodiment of the present invention.

In the present embodiment, a system using a disk as a recording medium is shown as an example. As described above, conventional systems have the normal speed as dubbing speed. A system in which the dubbing speed is N times of the normal speed, that is, the dubbing time is 1/N, is described below.

A data processing system 100 according to the present embodiment includes a data processor 110 on a transmission side, a data processor 120 on a reception side, and a communication cable 130 for connecting these processors. Further, the data processor 110 is connected to a disk 101 and a display device 102 on the transmission side, and the data processor 120 is connected to a disk 104 and a display device 103 on the reception side.

The data processor 110 on the transmission side includes a recording and reproducing unit 111, a memory 112, a display control unit 113, a CPU 114, a copy protection (C/P) unit 115, and a digital interface unit 116. The data processor 120 on the reception side comprises a digital interface unit 121, a copy protection (C/P) unit 122, a memory 123, a display control unit 124, a CPU 125, and a recording and reproducing unit 126. The digital interface units 116 and 121 are based on the IEEE Std 1394-1995 or the like.

First, the recording and reproducing unit 111 reads the moving picture data in the disk 101 on the transmission side, and stores it in the memory 112. The moving picture data stored in the memory 112 is transmitted to the display control unit 113 to be subjected to the decode processing, and displayed on the display device 102 as a monitor image at the time of dubbing. The moving picture data read in the recording and reproducing unit 111 is also inputted into the copy protection unit 115 by the control of the CPU 114. In the copy protection unit 115, the inputted moving picture data is subjected to an encryption processing in a mode complying with the copy limitation. Further, the CPU 114 performs the encryption processing to the moving picture data in the copy protection unit 115, and makes inquiry to the data processor 120 on the reception side as follows.

Figures 2, 3:
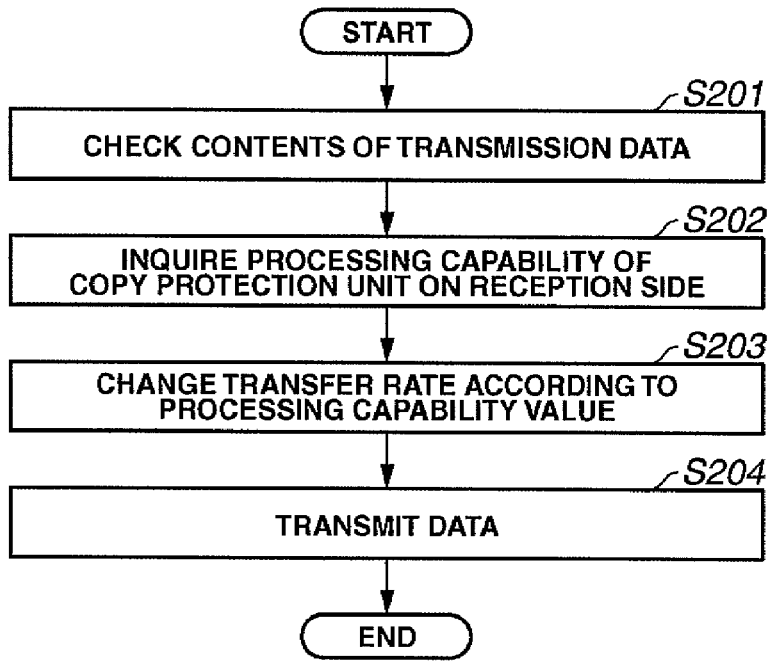
FIG. 2 is a flowchart illustrating the control in a data processor on a transmission side.
FIG. 3 is a view illustrating one example of a transfer rate on a transmission side, wherein the transfer rate is decided according to processing capability of a copy protection unit on a reception side.
Figure 4:
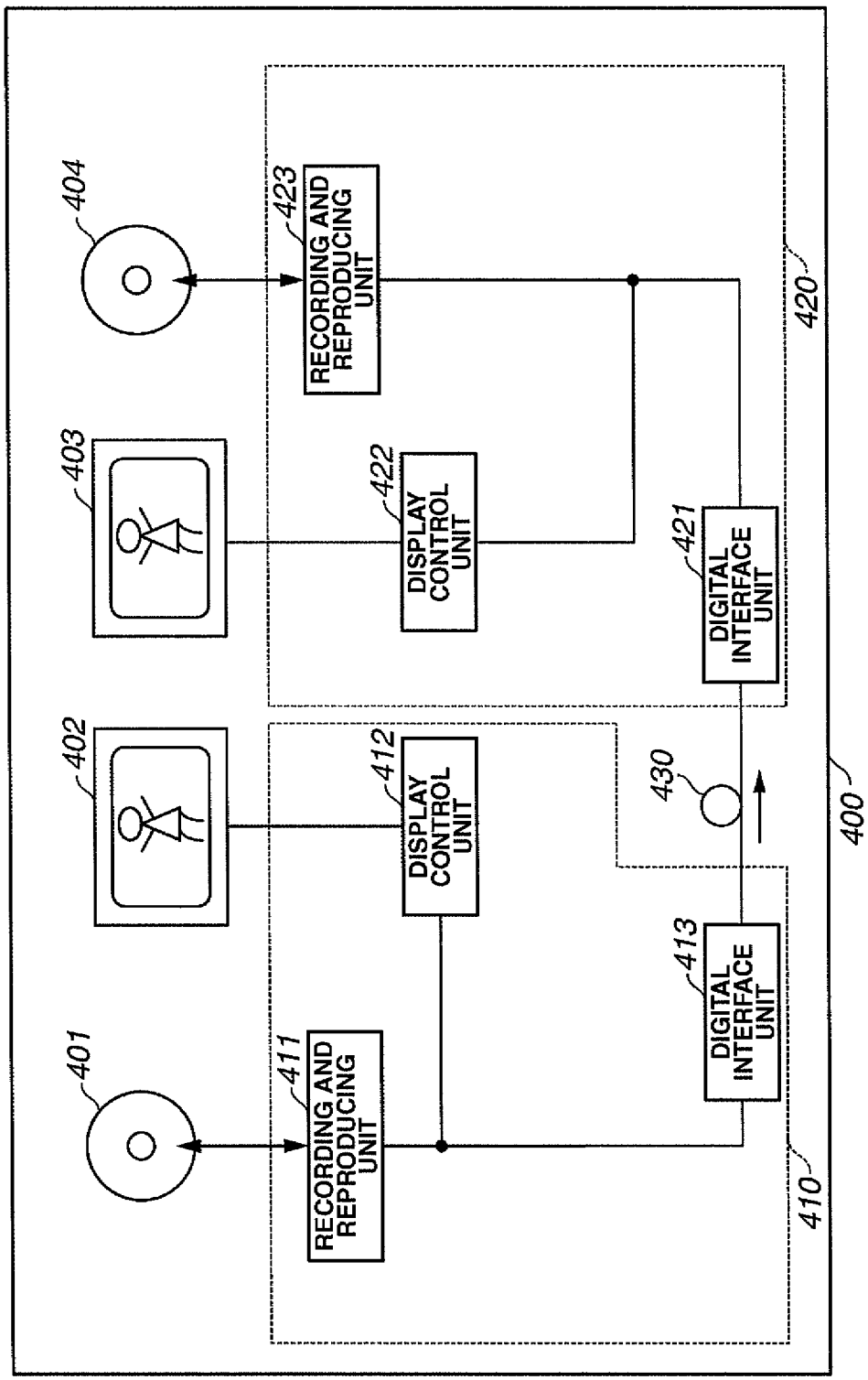
FIG. 4 is a block diagram illustrating one example of a data processing system.
Figure 5:
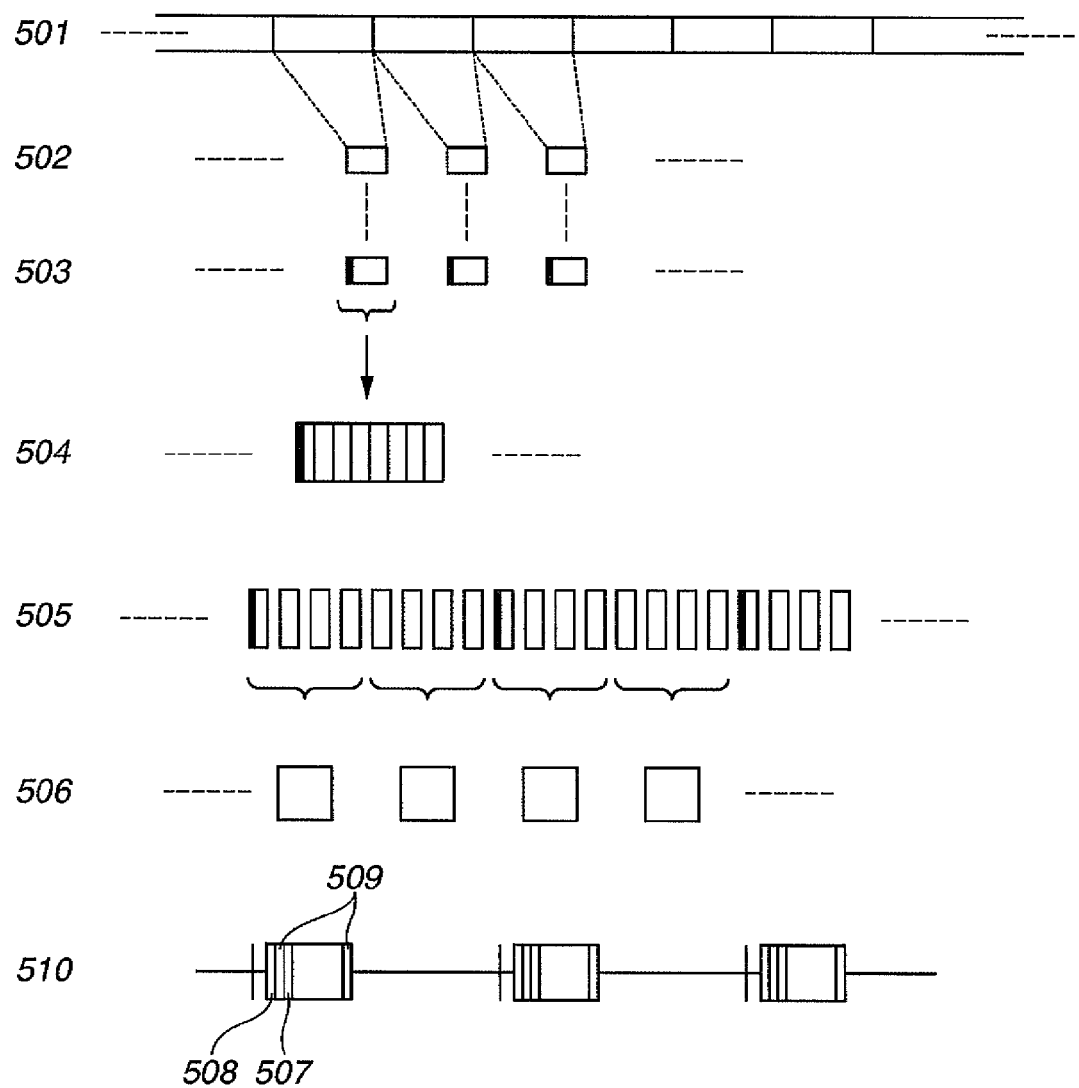
FIG. 5 is a schematic view when the recorded moving picture data is packetized to an isochronous packet.

FIG. 2 is a flowchart illustrating the control in the data processor 110 on a transmission side. First, in step S201, the contents of the moving picture data to be transmitted is checked by the CPU 114. When the moving picture data is recorded in the disk 101, various recording methods are employed depending on the copy limitation or the definition, e.g., SD (Standard Definition), HD (High Definition), or the like.

When the moving picture data to be transmitted does not have the copy limitation, the moving picture data is inputted into the digital interface unit 116 without performing the encryption processing by the copy protection unit 115. On the other hand, when the moving picture data to be transmitted has the copy limitation, the moving picture data is subjected to the encryption processing by the copy protection unit 115, and inputted into the digital interface unit 116.

Then, in step S202, inquiry about the processing capability of the copy protection unit 122 is made to the data processor 120 on the reception side by the CPU 114. The inquiry in step S202 is made using an asynchronous transfer. In accordance with the inquiry, the data processor 120 on the reception side notifies the CPU 114 of the transfer rate, which indicates the processing capability of the copy protection unit 122.

Then, in step S203, the transfer rate is changed by the CPU 114 depending on a processing capability value of the copy protection unit 122 for performing decryption, which is transferred from the data processor 120 on the reception side.

In the case where the value of the copy protection unit 122 with respect to processing capability of decrypting is higher than the standard rate SD, if the transmission is performed at the transfer rate of the normal reproduction, the maximum processing capability of the copy protection unit 122 on the reception side cannot be utilized. In such a case, according to the present embodiment, the transfer rate can be set highest within the permission range depending on the processing capability of the copy protection unit 122 in step S203. Accordingly, the processing time of the copy protection unit 122 can be shortened.

For example, in the case where the transfer rate of the moving picture data for transmitting is set to be the standard rate SD, the transfer rate of the copy protection unit 122 on the reception side corresponds with the HD and can perform the processing up to N times speed of the standard rate SD, the transfer rate of the moving picture data inputted into the digital interface unit 116 is changed by the CPU 114 to the rate which is N times of the standard rate SD set beforehand, in the processing of step S203.

On the other hand, in the case where a value of the copy protection unit 122 with respect to the processing capability of decrypting is lower than the standard rate SD, if the transmission is performed at the transfer rate of the normal reproduction, carrying out the dubbing is impossible on the reception side. On this case, according to the present embodiment, the transfer rate is lowered to the level at which the reception processing can be performed, depending on the processing capability value of the copy protection unit 122. Consequently, the processing in the copy protection unit 122 can be performed in a sure manner.

Then, in step S204, the moving picture data with the transfer rate changed in step S203 is transmitted to the data processor 120 on the reception side through the communication cable 130. At this time, according to the present embodiment, the moving picture data is transmitted to the data processor 120 at the N times speed of the normal reproduction.

In the data processor 120 on the receptions side, the moving picture data transmitted to the digital interface unit 121 is subjected to the encryption processing in the copy protection unit 122. The copy protection unit 122 performs the decryption processing by calculating the key for deciphering the encryption which was employed in the encryption processing in the copy protection unit 115 so as to select a suitable mode. Even when the transfer rate in the data processor 110 on the transmission side is changed, the moving picture data having the transfer rate, which is lower than the maximum processing capability of the data processor 120, is constantly transmitted, so that the decryption processing is performed smoothly.

FIG. 3 is a view illustrating one example of the transfer rate on the transmission side, wherein the transfer rate is decided according to the processing capability of the copy protection unit on the reception side.

SD is handled as the standard value, and HD always requires the transfer rate higher than the SD value. As described above, the moving picture data having the transfer rate of HD cannot generally be dubbed on the reception side which has only the processing capability of SD. However, in the present embodiment, the dubbing process of such moving picture data becomes possible by changing the transfer rate to the lower one, which can be interpreted by SD. Further, depending on the changed transfer rate, the processing can be performed faster than the normal reproduction, in constituent elements at a stage subsequent to the copy protection unit 122.

Then, as illustrated in FIG. 1, in the data processor 120 on the reception side, the moving picture data decrypted by the copy protection unit 122 is stored in the memory 123, subjected to the decode processing in the display control unit 124, and displayed on the displayed device 103. Further, the moving picture data decrypted by the copy protection unit 122 is inputted into the recording and reproducing unit 126, and written to the disk 104.

In the present embodiment, the moving picture data is shown as the recorded data on the disk 101 as an example. However, the present invention is not limited to this example and, any data, for instance, voice data, which would enable practice of the present invention, may be stored as the recorded data.

Further, in the present embodiment, as an example, the processing capability value of the copy protection unit 122 is sought in inquiring about the processing capability value of the data processor 120 on the reception side. However, the present invention is not limited to this example, and any information, for instance, writing speed of the recording data in the disk 104, writing speed of the recording data in the memory 123, or reading speed of the recording data from the memory 123, that would enable practice of the present invention may be sought.

Further, in the present embodiment, as the packet of the recorded data on the disk 101, for example, the MPEG-2 transport stream packet can be applied. The transfer rate of a packet stream, which is preset to the recorded data, is set according to a type of the recording format of the data recorded on the disk 101. Further, the recording medium is not limited to the disk and, any recording medium, for example, a semiconductor memory, that would enable practice of the present invention may be used.

In the present embodiment, as an example of the method for inquiring about the processing capability in the data processor on the reception side, an inquiry about the processing capability is made from the data processor on the transmission side. However, the present invention is not limited to this example, and any method for transferring the processing capability that would enable practice of the present invention is applicable. For instance, the processing capability of the data processor 120 may be transmitted from the data processor 120 itself on the reception side to the data processor 110 on the transmission side. Further, the data processor 120 may also be configured such that an inquiry is made to the data processor 110 on the transmission side by the CPU 125 about the transfer rate with respect to the packet stream of the recorded data, which is a receiving target, and an instruction is given to the data processor 110 on the transmission side to change the transfer rate of the recorded data if thus obtained transfer rate of the recorded data does not match the processing capability value of the data processor 120. In this case, the data processor 110 on the transmission side changes the transfer rate of the packet stream of the recorded data based on the instruction to change the transfer rate which is given by the data processor 120 on the reception side.

The above-described embodiment of the present invention can be realized by a computer executing a program. Further, as a means for supplying the program to the computer, for example, a recording medium which can be read by the computer, such as a CD-ROM storing such program, or a transmitting medium, such as the Internet which transmits such program, can be employed. The embodiment of the present invention has been described above referring to the drawings in detail. However, the specific configuration is not limited to the above-described embodiment, and can be changed within a suitable range not deviating from the essential features of the present invention.

According to the above-described embodiment, in the data processor 110 on the transmission side, the transfer rate in the packet stream of the recorded data in the disk 101 is changed depending on the processing capability of the data processor 120 on the reception side. Accordingly, the most suitable data transfer can be realized for both of the data processors.

For example, if the processing capability of the data processor 120 on the reception side is higher than the preset transfer rate of the packet stream of the recording data, the transfer rate is set higher depending on the processing capability of the data processor 120. Thereby, the recording data can be transferred at high speed, and the dubbing time of the recorded data can be shortened. On the other hand, if the processing capability of the data processor 120 on the reception side is lower than the preset transfer rate of the packet stream of the recording data, the transfer rate is set lower according to the processing capability of the data processor 120. Accordingly, it becomes possible to solve the problem in that the recorded data cannot be dubbed at the data processor 120 on the reception side.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A transmission device for transmitting an encrypted moving image data to a reception device, the transmission device comprising:
   an encryption unit configured to generate the encrypted moving image data;
   a control unit configured (a) to request that the reception device transmits a processing capability of a decryption unit to the transmission device, wherein the decryption unit is configured to decrypt the encrypted moving image data and is included in the reception device, and (b) to change a transfer rate of the encrypted moving image data to one of a first transfer rate and a second transfer rate based on the processing capability transmitted from the reception device to the transmission device, wherein the second transfer rate is lower than the first transfer rate; and
   a transmission unit configured (a) to transmit the encrypted moving image data to the reception device using the first transfer rate if the transfer rate of the encrypted moving image data is changed to the first transfer rate, and (b) to transmit the encrypted moving image data to the reception device using the second transfer rate if the transfer rate of the encrypted moving image data is changed to the second transfer rate.

2. The transmission device according to claim 1, wherein the first transfer rate is higher than a normal transfer rate and the second transfer rate is lower than the normal transfer rate.

3. The transmission device according to claim 1, wherein the control unit changes the transfer rate of the encrypted moving image data to the first transfer rate if the processing capability transmitted from the reception device to the transmission device is higher than a standard rate.

4. The transmission device according to claim 1, wherein the control unit changes the transfer rate of the encrypted moving image data to the second transfer rate if the processing capability transmitted from the reception device to the transmission device is lower than a standard rate.

5. The transmission device according to claim 1, wherein the transfer rate of the encrypted moving image data is changed to the first transfer rate if the processing capability transmitted from the reception device to the transmission device is higher than a standard rate, and
   wherein the transfer rate of the encrypted moving image data is changed to the second transfer rate if the processing capability transmitted from the reception device to the transmission device is lower than the standard rate.

6. The transmission device according to claim 1, further comprising:
   the obtaining unit is configured to obtain moving image data from a recording medium,
   wherein the encryption unit generates the encrypted moving image data from the moving image data obtained from the obtaining unit.

7. The transmission device according to claim 6, wherein the first transfer rate is higher than a normal transfer rate and the second transfer rate is lower than the normal transfer rate.

8. The transmission device according to claim 6, wherein the control unit changes the transfer rate of the encrypted moving image data to the first transfer rate if the processing capability transmitted from the reception device to the transmission device is higher than a standard rate.

9. The transmission device according to claim 6, wherein the control unit changes the transfer rate of the encrypted moving image data to the second transfer rate if the processing capability transmitted from the reception device to the transmission device is lower than a standard rate.

10. A non-transitory computer-readable storage medium that stores a program for causing a computer to act as the transmission device according to claim 1.

11. A method for controlling a transmission device that transmits an encrypted moving image data to a reception device, the method comprising the steps of:
    generating the encrypted moving image data;
    requesting that the reception device transmits a processing capability of a decryption unit to the transmission device, wherein the decryption unit is configured to decrypt the encrypted moving image data and is included in the reception device;
    changing a transfer rate of the encrypted moving image data to one of a first transfer rate and a second transfer rate based on the processing capability transmitted from the reception device to the transmission device, wherein the second transfer rate is lower than the first transfer rate;
    transmitting the encrypted moving image data to the reception device using the first transfer rate if the transfer rate of the encrypted moving image data is changed to the first transfer rate; and
    transmitting the encrypted moving image data to the reception device using the second transfer rate if the transfer rate of the encrypted moving image data is changed to the second transfer rate,
    wherein the method is performed by a processor.

12. The method according to claim 11, wherein the first transfer rate is higher than a normal transfer rate and the second transfer rate is lower than the normal transfer rate.

13. The method according to claim 11, wherein the transfer rate of the encrypted moving image data is changed to the first transfer rate if the processing capability transmitted from the reception device to the transmission device is higher than a standard rate.

14. The method according to claim 11, wherein the transfer rate of the encrypted moving image data is changed to the second transfer rate if the processing capability transmitted from the reception device to the transmission device is lower than a standard rate.

15. The method according to claim 11, wherein the transfer rate of the encrypted moving image data is changed to the first transfer rate if the processing capability transmitted from the reception device to the transmission device is higher than a standard rate, and
    wherein the transfer rate of the encrypted moving image data is changed to the second transfer rate if the processing capability transmitted from the reception device to the transmission device is lower than the standard rate.

16. The method according to claim 11, wherein the transmission device includes the obtaining unit configured to obtain moving image data from a recording medium, and
    wherein the encrypted moving image data is generated from the moving image data obtained from the obtaining unit.

17. The method according to claim 16, wherein the first transfer rate is higher than a normal transfer rate and the second transfer rate is lower than the normal transfer rate.

18. The method according to claim 16, wherein the transfer rate of the encrypted moving image data is changed to the first transfer rate if the processing capability transmitted from the reception device to the transmission device is higher than a standard rate.

19. The method according to claim 16, wherein the transfer rate of the encrypted moving image data is changed to the second transfer rate if the processing capability transmitted from the reception device to the transmission device is lower than a standard rate.

20. A non-transitory computer-readable storage medium that stores a program for causing a computer to execute the method according to claim 11.

* * * * *